United States Patent
Detzer

[11] Patent Number: 5,368,816
[45] Date of Patent: Nov. 29, 1994

[54] CONDITIONING AIR FOR HUMAN USE

[75] Inventor: Rüdiger Detzer, Buseck, Germany

[73] Assignee: KesslerTech GmbH, Giessen, Germany

[21] Appl. No.: 51,447

[22] Filed: Apr. 22, 1993

[30] Foreign Application Priority Data

Apr. 28, 1992 [DE] Germany .............................. 4213778

[51] Int. Cl.$^5$ .............................................. A61L 9/00
[52] U.S. Cl. .......................................... 422/28; 422/4; 422/5; 422/186.07; 422/172
[58] Field of Search ........... 422/4, 5, 186.07, 170–172, 422/177.28, 34

[56] References Cited
FOREIGN PATENT DOCUMENTS
0431648 12/1991 European Pat. Off. .

*Primary Examiner*—Lyle A. Alexander
*Attorney, Agent, or Firm*—Herbert Dubno; Andrew Wilford

[57] ABSTRACT

A stream of air containing oxidizable pollutants is passed in an air-conditioning system through a conditioning station, an ozonating station, a filter station downstream of the ozonating station, and a testing station downstream of the filter station and then introduced into a living space. Ozone is added to the stream in the ozone station to oxidize the pollutants in the stream. The added ozone is decomposed into stable oxygen in the filter station and the ozone concentration in the stream is detected at the testing station with a sensor and the system is at least partially shut down when the detected ozone concentration exceeds a predetermined safety threshold. The concentration of pollutants in the stream is detected upstream of the ozonating station and the amount of ozone added to the stream in the ozonating station is adjusted so that it just corresponds to the amount needed to oxidize the pollutants sensed and does not substantially exceed this amount. In addition one periodically introduces into the stream at a location downstream of the filter station and upstream of the testing station a quantity of ozone sufficient to raise the ozone concentration in the gas stream above a predetermined threshold level detectable by the sensor and insufficient to raise the ozone concentration in the gas stream above the predetermined safety threshold so that the sensor is periodically tested.

12 Claims, 1 Drawing Sheet

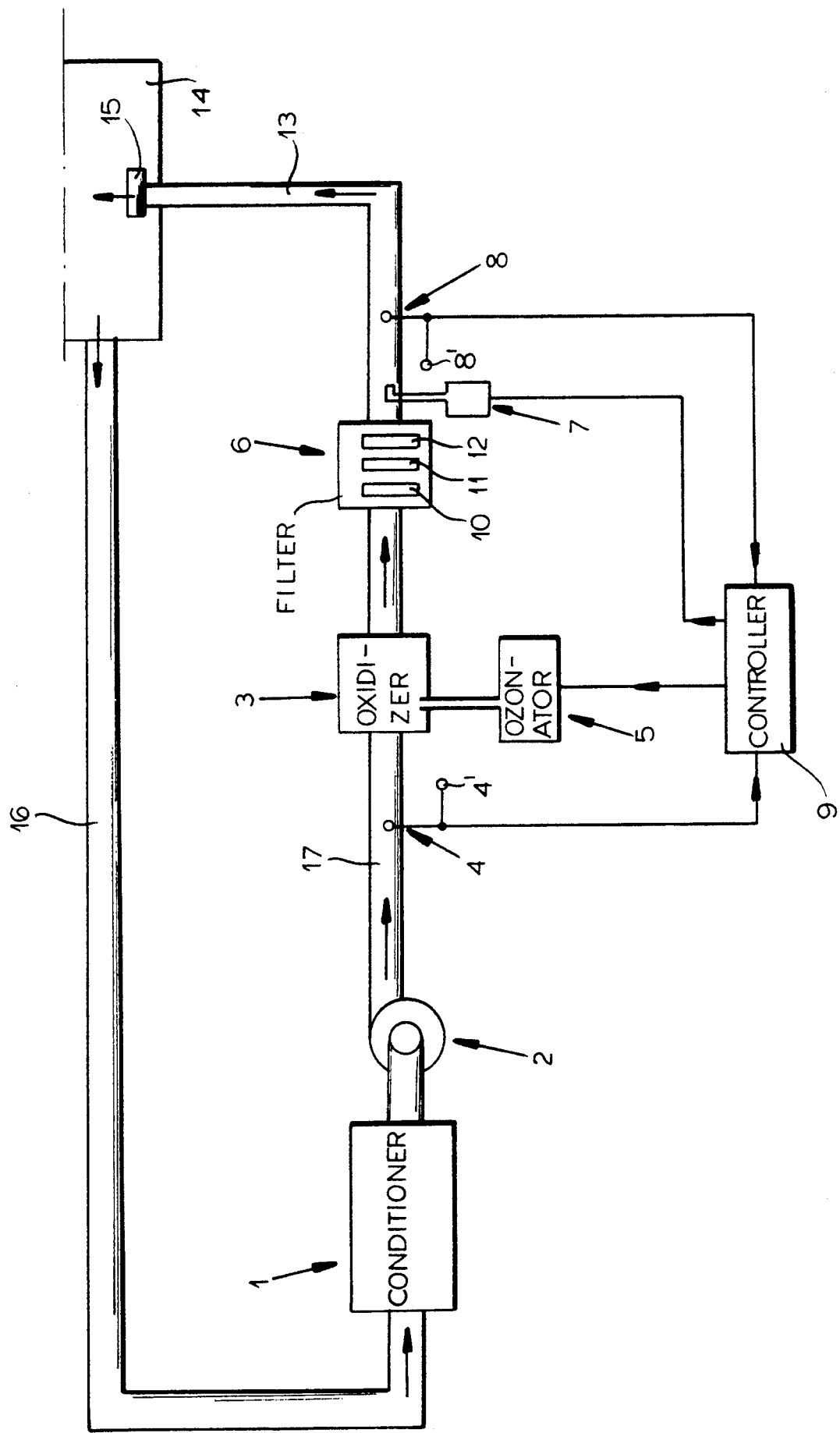

CONDITIONING AIR FOR HUMAN USE

FIELD OF THE INVENTION

The present invention relates to conditioning air for human use. More particularly this invention concerns an air-conditioning method that eliminates harmful pollutants in recirculated indoor air.

BACKGROUND OF THE INVENTION

European patent publication 431,648 of G. E. Keller (based on US application Ser. No. 07/447,996 filed Dec. 8, 1989 now abandoned) describes a method for conditioning indoor air in a forced-air heating/cooling system by adding ozone to the stream of recirculated air to eliminate various pollutants, in particular volatile organic compounds (VOC's). Downstream of the location where the ozone is added, the air stream is passed through a catalytic filter arrangement to strip out the ozone before the air stream is reintroduced into a living space, which term is here intended to cover any enclosed area where people live, work, play, or are present for other purposes.

While ozone is an excellent material for oxidizing VOC's, it is itself a highly toxic substance whose maximum concentration in air should not exceed a threshold level of 0.1 ppm (MAK value). The concentration needed for effective decomposition of the various pollutants must exceed this threshold level by a great deal, so invariable a decomposition- or converter-type filter is provided downstream of the location where the ozone is introduced into the stream. This filter uses a catalyst, typically of platinum or nickel, to decompose the ozone ($O_3$) into stable molecular oxygen ($O_2$).

In the above-described system of Keller, two ozone sensors are provided, one upstream of the ozonator and one downstream of the decomposition filter. The upstream sensor determines the ozone content of the gas stream being treated before any treatment, and the downstream after it is ready to reintroduce into the living space. The outputs of these two sensors are fed to the ozonator and it feeds into the stream being treated an amount of ozone determined by them.

The main disadvantage of this system is that the amount of ozone added to the stream is normally calculated to be sufficient to take care of the maximum amount of pollutants that are expected to be encountered. This puts a considerable load on the decomposition filter, in particular when the actual level of pollutants is low so that most of the added ozone must be oxidized at the filter.

Another problem is that if a portion of the filter goes bad so that ozone can get through it without being oxidized, it is possible for a toxic level of ozone, that is a concentration exceeding the above-mentioned 0.5 ppm threshold, to be present in the air stream that is reintroduced into the living space. Clearly this should be sensed by the downstream ozone sensor, which is typically quite sensitive. Nonetheless practice has shown that since this downstream sensor only rarely is exposed to enough ozone to produce a meaningful output, it is fairly common for this element of the system to fail without anyone knowing that it has done so.

OBJECTS OF THE INVENTION

It is therefore an object of the present invention to provide an improved air-conditioning system.

Another object is the provision of such an improved air-conditioning system which overcomes the above-given disadvantages, that is which operates very efficiently and that is very safe.

SUMMARY OF THE INVENTION

The instant invention is an improvement on an air-conditioning system wherein a stream of air containing oxidizable pollutants is passed through a conditioning station, an ozonating station, a filter station downstream of the ozonating station, and a testing station downstream of the filter station and then introduced into a living space. The stream is conditioned with respect to its temperature and/or humidity in the conditioning station and ozone is added to it in the ozone station to oxidize the pollutants in the stream. The added ozone is decomposed into stable oxygen ($O_2$) in the filter station and the ozone concentration in the stream is detected at the testing station with a sensor and the system is at least partially shut down when the detected ozone concentration exceeds a predetermined safety threshold. The concentration of pollutants in the stream is detected upstream of the ozonating station and according to the invention the amount of ozone added to the stream in the ozonating station is adjusted so that it just corresponds to the amount needed to oxidize the pollutants sensed and does not substantially exceed this amount. In addition according to the invention one periodically introduces into the stream at a location downstream of the filter station and upstream of the testing station a quantity of ozone sufficient to raise the ozone concentration in the gas stream above a predetermined detectable threshold level detectable by the sensor and insufficient to raise the ozone concentration in the gas stream above the predetermined safety threshold so that the sensor is periodically tested.

Thus with the system of this invention on the one hand the amount of ozone is accurately tailored to the level of pollutants. Thus while the system is dimensioned to be able to process the maximum amount of VOC's and other oxidizable pollutants, it normally is not run full-bore, but is only run at a level to process what is actually present. This represents a significant saving in operating costs and extends the service life of the equipment.

Furthermore the self-test arrangement of the invention insures that the output sensor will not fail unnoticed. Periodically an amount of ozone is injected into the exiting stream that is insufficient to have any toxic effects but that is enough to be detectable, and if the sensor does not respond, the system is shut down. Clearly the sensor must have a minimum-response threshold that is low enough that the amount of ozone detected will not represent a health hazard. Thus this vital element is periodically tested so that the system will not be left to operate while adding a toxic pollutant to the air stream it is processing.

The upstream sensor according to this invention measures the quantity of pollutants in the gas stream. This periodically derived measurement is integrated to give the quantity over time so the exact amount of ozone is injected to handle the detected level of pollutants.

In accordance with this invention the conditioning station is upstream of the ozonating station and the air stream is passed through a sulfur filter and an adsorption filter in the filter station. Thus any pollutants in the air-conditioning machine itself, like disease-causing bacteria that can live on wet condenser coils, are eliminated. Furthermore according to the invention the air stream is mixed or blended in a diffuser immediately before introducing it into the living space to smooth the density of the air stream. Thus the tiny amount of ozone present in the air stream for test purposes will be effectively diluted.

Normally according to the invention during each introduction of ozone into the stream at the location the addition of ozone to the stream at the ozonating station is stopped.

In the air conditioning system of this invention the upstream sensor is a tin-oxide sensor which has a plurality of semiconducting sectors each capable of detecting a different type of pollutant. This upstream sensor can include a sensor outside the gas stream and serving to generate a control signal. On the other hand, the downstream sensor is a UV-absorption sensor or a chemoluminescent sensor. The downstream sensor can have at least one semiconducting sector of pthalocyanin, a well known organic semiconductor, as described in German patent document 3,836,819. This downstream sensor can also include a sensor outside the gas stream and serving to generate a control signal.

BRIEF DESCRIPTION OF THE DRAWING

The above and other objects, features, and advantages will become more readily apparent from the following, reference being made to the accompanying drawing whose sole FIGURE is a schematic or diagrammatic representation of the system of this invention.

SPECIFIC DESCRIPTION

As seen in the drawing a standard air-conditioning unit 1 which can include a heater, a cooler, a humidifier, and a dehumidifier is provided immediately upstream of a fan 2 so that air is drawn out of a living space 14 through a return duct 16. Immediately downstream of the fan 2 in a main flow duct 17 is a standard oxidizing unit 3 which operates by the addition of ozone from an ozonator 5 of conventional design. Downstream in the duct 17 of the oxidizer 3 is a filter unit 6 that strips out the oxidized pollutants so that the cleaned and conditioned air can be returned to the space 14 through a duct 13 having at its outlet end a diffuser 15.

According to the invention a pollutant sensor 4 is provided in the stream upstream of the oxidizer 3. This sensor 4 is of the tin-oxide type and produces an electrical output that corresponds to the instantaneously detected concentration of the pollutants the sensor is tuned to. Typically such a sensor has a plurality of semiconducting sectors that each respond to a respective type of pollutant, normally a VOC. In addition each such sensor 4 is associated with another control sensor 4' outside the duct 17 that produces a control output used to calibrate and verify operation of the sensor 4. The outputs of both sensors 4 and 4' are fed to a controller 9 that operates the ozonator 5 to inject into the conduit or duct 17 an amount of ozone ($O_3$) just capable of oxidizing the detected pollutants.

The filter unit 6 includes a sulfur-compound filter 10, an adsorption filter 11, and a decomposition or converting filter 12. These individual filters 10, 11, and 12 strip out the noxious components and convert the unused ozone back into stable molecular oxygen ($O_2$).

Immediately downstream of the filter 7 in what should be a stream of clean ozone-free air is a small ozone generator 7 and immediately downstream thereof from a highly sensitive ozone sensor 8, both connected to the controller 9. The controller 9 periodically shuts down the ozonator 5 and fires the ozonator 7 to inject into the air stream in the conduit 17 a tiny pulse of ozone. The sensor 8 then should detect it, comparing its output to the output of an outside control sensor 8', in which case normal operation is resumed. If for some reason, such as failure of the sensor 8, the ozone shot added at 7 is not detected, the entire system is shut down. Of course the sensor 8 also detects when any ozone gets past the filter unit 6 and shuts down the system in this situation also.

I claim:

1. In an air-conditioning system operated in accordance with the method comprising the steps of:
    passing a stream of air containing oxidizable pollutants along a path through a conditioning station, an ozonating station, a filter station downstream of the ozonating station, and a testing station downstream of the filter station and then introducing the stream into a living space;
    conditioning the air stream in the path with respect to its temperature and/or humidity in the conditioning station;
    at least periodically adding ozone to the air stream in the ozonating station to oxidize the pollutants in the stream;
    decomposing the added ozone in the filter station to stable oxygen; and
    detecting the ozone concentration in the stream at the testing station with a sensor and at least partially shutting down the system when the detected ozone concentration exceeds a predetermined safety threshold,
    the improvement comprising the steps of:
    detecting the concentration of pollutants in the stream upstream of the ozonating station;
    adjusting the amount of ozone added to the stream in the ozonating station so that it just corresponds to the amount needed to oxidize the pollutants detected and does not substantially exceed this amount needed to oxidize the pollutants; and
    periodically injecting into the stream at an injection location downstream of the filter station and upstream of the testing station a quantity of ozone sufficient to raise the ozone concentration in the gas stream above a predetermined detectable threshold level detectable by the sensor and insufficient to raise the ozone concentration in the gas stream above the predetermined safety threshold, whereby the sensor is periodically tested.

2. The air-conditioning method defined in claim 1 wherein the air stream is passed through a sulfur filter in the filter station.

3. The air-conditioning method defined in claim 1 wherein the air stream is passed through an absorption filter in the filter station.

4. The air-conditioning method defined in claim 1, further comprising the step of
    mixing the air stream in a diffuser downstream of the testing station immediately before introducing it into the living space.

5. The air-conditioning method defined in claim 1 wherein during each introduction of ozone into the stream at the location, the addition of ozone to the stream at the ozonating station is stopped.

6. In an air-conditioning system comprising:

means for passing a stream of air containing oxidizable pollutants along a path through a conditioning station, an ozonating station, a filter station downstream of the ozonating station, and a testing station downstream of the filter station and then introducing the stream into a living space;

means in the path and in the conditioning station for conditioning the air stream with respect to its temperature and/or humidity;

means in the ozonating station for at least periodically adding ozone to the air stream to oxidize the pollutants in the stream;

means in the filter station for decomposing the added ozone to stable oxygen; and means in the testing station including a downstream sensor for detecting the ozone concentration in the stream and at least partially shutting down the system when the detected ozone concentration exceeds a predetermined safety threshold;, the improvement comprising:

means including an upstream sensor upstream of the ozonating station for detecting the concentration of pollutants in the stream;

control means connected to the ozone-adding means and to the upstream sensor for adjusting the amount of ozone added to the stream in the ozonating station so that it just corresponds to the amount needed to oxidize the pollutants detected and does not substantially exceed this amount needed to oxidize the pollutants; and means for periodically injecting into the stream at an injection location downstream of the filter station and upstream of the testing station a quantity of ozone sufficient to raise the ozone concentration in the gas stream above a predetermined detectable threshold level detectable by the downstream sensor and insufficient to raise the ozone concentration in the gas stream above the predetermined safety threshold, whereby the downstream sensor is periodically tested.

7. The air-conditioning system defined in claim 6 wherein the upstream sensor includes a sensor outside the gas stream and serving to generate a control signal.

8. The air-conditioning system defined in claim 6 wherein the downstream sensor is a UV-absorption sensor.

9. The air-conditioning system defined in claim 6 wherein the downstream sensor is a chemoluminescent sensor.

10. The air-conditioning system defined in claim 6 wherein the downstream sensor includes a sensor outside the gas stream and serving to generate a control signal.

11. The air-conditioning system defined in claim 6 wherein the upstream sensor is a tin-oxide sensor.

12. The air-conditioning system defined in claim 11 wherein the upstream sensor has a plurality of semiconducting sectors each capable of detecting a different type of pollutant.

* * * * *

UNITED STATES PATENT AND TRADEMARK OFFICE
CERTIFICATE OF CORRECTION

PATENT NO. : 5,368,816
DATED : 29 November 1994
INVENTOR(S) : Rüdiger DETZER

It is certified that error appears in the above-identified patent and that said Letters Patent is hereby corrected as shown below: Title page:

Item: [73] for "Glessen" read -- Giessen --.

Signed and Sealed this

Twenty-eight Day of March, 1995

Attest:

BRUCE LEHMAN

*Attesting Officer*     *Commissioner of Patents and Trademarks*